US006880489B2

(12) United States Patent
Hartmann et al.

(10) Patent No.: US 6,880,489 B2
(45) Date of Patent: Apr. 19, 2005

(54) SUPPORT FOR TREATMENT OF CANINE HIP DYSPLASIA AND LUMBOSACRAL DISORDERS

(76) Inventors: Karen C. Hartmann, 151 Mountain Hollow Rd., Alexander, NC (US) 28701; Elizabeth B. Eve, 97 June Sayles Rd., Asheville, NC (US) 28803

( * ) Notice: Subject to any disclaimer, the term of this patent is extended or adjusted under 35 U.S.C. 154(b) by 6 days.

(21) Appl. No.: 10/429,154

(22) Filed: May 2, 2003

(65) Prior Publication Data

US 2004/0244725 A1 Dec. 9, 2004

(51) Int. Cl.[7] ............................................. A01K 15/00
(52) U.S. Cl. ...................................................... 119/856
(58) Field of Search ................................. 119/856, 850

(56) References Cited

U.S. PATENT DOCUMENTS

| | | | | |
|---|---|---|---|---|
| 3,795 A | | 10/1844 | Whiton | 2/44 |
| 2,417,803 A | * | 3/1947 | De Mar | 54/79.1 |
| 4,385,592 A | | 5/1983 | Goldstein | 119/96 |
| 5,256,135 A | | 10/1993 | Avihod | 602/19 |
| 5,425,702 A | | 6/1995 | Carn et al. | 602/62 |
| 5,466,214 A | | 11/1995 | Garciduenas | 602/19 |
| 5,656,023 A | | 8/1997 | Caprio et al. | 602/63 |
| 5,845,606 A | * | 12/1998 | Hartman | 119/856 |
| 5,853,378 A | | 12/1998 | Modglin | 602/19 |
| 5,941,199 A | * | 8/1999 | Tamura | 119/850 |
| 6,066,108 A | | 5/2000 | Lundberg | 602/23 |
| 6,082,308 A | * | 7/2000 | Walter | 119/769 |
| 6,363,697 B1 | | 4/2002 | Shapiro | 54/23 |
| 6,543,390 B1 | * | 4/2003 | Lowery | 119/771 |
| 6,729,268 B1 | * | 5/2004 | Costell | 119/726 |
| 2002/0068890 A1 | | 6/2002 | Schwenn et al. | 602/19 |
| 2002/0082537 A1 | | 6/2002 | MacAllister | 602/4 |

* cited by examiner

*Primary Examiner*—Teri P. Luu
*Assistant Examiner*—Kimberly S. Smith
(74) *Attorney, Agent, or Firm*—Joseph T. Guy; Nexsen Pruet LLC

(57) ABSTRACT

A prosthetic device suitable for treating canine hip dysplasia and lumbosacral disorders and method of use. The prosthetic device comprises a harness attachable to the canine. Complementary rear braces are provided comprising a right brace and a left brace wherein the right brace comprises a right leg strap for encircling the right leg of the canine, and the left brace comprises a left leg strap for encircling the left leg of the canine. The right brace and left brace are engageable to apply force to persuade the hip towards a natural position. A tether between the harness and the complementary rear braces draws the right brace and left brace forward.

19 Claims, 3 Drawing Sheets

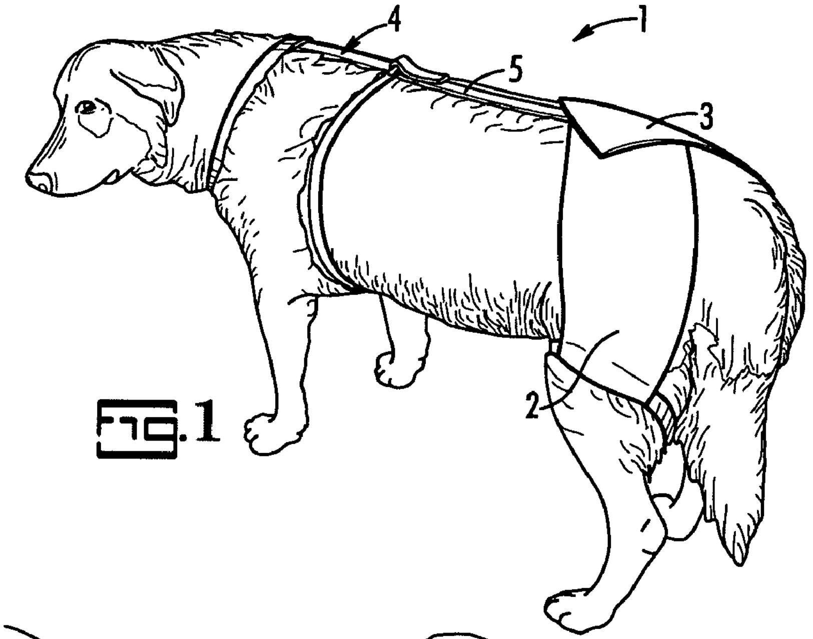
FIG. 1
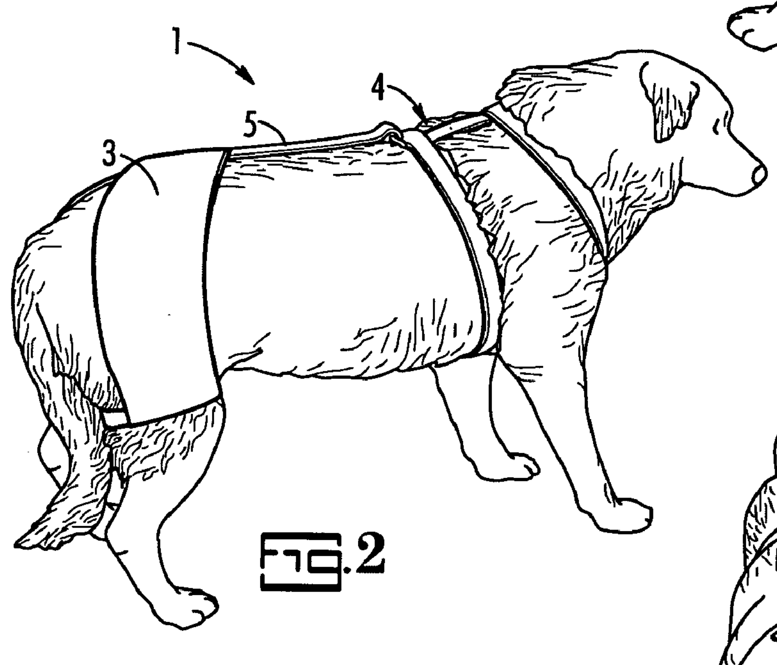
FIG. 2
FIG. 3
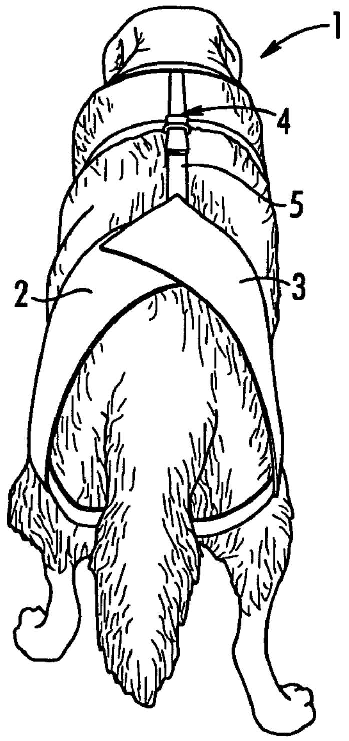

SUPPORT FOR TREATMENT OF CANINE HIP DYSPLASIA AND LUMBOSACRAL DISORDERS

BACKGROUND OF THE INVENTION

The present invention is related to a support particularly suitable for use in the treatment of canine hip dysplasia, lumbosacral disorder and for relief of symptoms associated therewith.

Hip dysplasia is a common ailment in canines and animals of similar skeletal structure. Dysplasia is considered to be a genetically predisposed condition resulting from improper growth of the joint components. Early signs of dysplasia are joint looseness, also referred to as laxity, which can increase in severity to subluxation, or partial dislocation of the hip joint. Ultimately the disease can be manifest as severe arthritic change in the joint structure.

Treatment of canine hip dysplasia (CHD) depends on the severity. Severity often is a function of the animals age when CHD is accurately diagnosed. If detected early the effects of CHD can be mitigated by conservative treatments including weight control supplements and exercise. As with any joint disease, movement can be painful and therefore an animal may become lethargic even in the early stages of CHD. Inactivity exasperates CHD, therefore, it is important to exercise an animal with CHD yet it is difficult to entice a diseased animal to exercise due to the pain. More advanced stages of CHD may require medication or surgery. Even in severe cases improving muscle tone can mitigate the effects of the disease process and, in some cases, arrest the deterioration.

As with any medical procedure it is the desire of the clinician to minimize the necessity for medication and surgery whenever possible. Unfortunately, the most effective way to accomplish this goal is unattractive to the animal due to hip pain. It has therefore been a long-standing desire for a device which can alleviate, prosthetically, the pain associated with CHD. Minimizing the pain allows more conservative treatment to be aggressively pursued thereby potentially eliminating surgical or drug related intervention.

BRIEF SUMMARY OF THE INVENTION

It is object of the present invention to provide a prosthetic device particularly suitable for decreasing the symptoms associated with CHD and lumbosacral disorder (LSD). By decreasing the joint pain associated with LSD and CHD therapy can be employed to mitigate, or reverse, the disease process.

It is another object of the present invention to provide a treatment for LSD and CHD which avoids, or at least delays, surgical intervention or drugs and which can easily be utilized without medical supervision.

It is another object of the present invention to provide an economical reusable prosthetic device.

A particular feature of the present invention is the ability to augment the tendons of the hip to support the hip joint in a natural position without impeding the motion of the knee joint.

These and other advantages are provided in a prosthetic device suitable for treating canine hip dysplasia and lumbosacral disorders. The prosthetic device comprises a harness attachable to the canine. Complementary rear braces are provided comprising a right brace and a left brace wherein the right brace comprises a right leg strap for encircling the right leg of the canine, and the left brace comprises a left leg strap for encircling the left leg of the canine. The right brace and left brace are engageable to apply force to persuade the hip towards a natural position. A tether between the harness and the complementary rear braces draws the right brace and left brace superior and anterior.

Another embodiment is provided in a prosthetic device for treating canine hip dysplasia and lumbosacral disorder. The device comprises a harness attachable to the canine and a rear brace. The rear brace comprises a right brace and a left brace. The right brace comprises a right leg strap for encircling a right leg of the canine, and the left brace comprises a left leg strap for encircling a left leg of the canine. The right brace is attached to the left brace. A tether between the harness and the complementary rear braces persuade the rear brace toward the harness superior and anterior.

A particularly preferred embodiment is provided in a method for treating canine hip dysplasia and lumbosacral disorder. The method comprises the steps of attaching a harness to a canine. A right brace is attached to the right hip of said canine and a left brace is attached to the left hip of the canine. The right brace is connected to the left brace wherein the right brace and left brace persuade the right hip and the left hip inward towards each other and the femur persuaded superior to secure to the acetabulum. A tether is connected between the harness and at least one brace selected from the right brace and the left brace to persuade the right brace and the left brace towards the harness superior and anterior.

BRIEF SUMMARY OF THE DRAWINGS

FIG. 1 is a left side view of an embodiment of the present invention as applied to a canine.

FIG. 2 is a right side view of the embodiment of FIG. 1.

FIG. 3 is a rear view of the embodiment of FIGS. 1 and 2.

DETAILED DESCRIPTION OF THE INVENTION

The inventors of the present application have developed a canine prosthetic device particularly suitable for reducing symptoms associated with CHD and LSD. The prosthetic device will be described with reference to the various figures forming a part of the present disclosure.

A prosthetic device of the present invention is illustrated in left side view in FIG. 1, in right side view in FIG. 2 and in rear view in FIG. 3 as the various components are arranged in use.

The prosthetic device, generally represented at 1, comprises complementary rear braces, 2 and 3, which simultaneously draw the rear hips inward towards each other and superior, a forward harness, 4, and a tether, 5, draw the complementary rear braces towards the harness. The various components persuade the upper leg superior, anterior and inward thereby persuading the ball of the hip joint into the socket of the hip joint in a natural position. By supporting the hip joint in this manner the effects of laxity are mitigated and the pain associated therewith is minimized. Furthermore, as the animal moves the prosthetic device supports the leg in a proper position to fully engage the hip joint in the natural position without limiting the motions associated with walking. The prosthetic device augments the tendons and counteracts the tendency of a joint with CHD and LSD to be, at least partially, disengaged.

Figure 4:
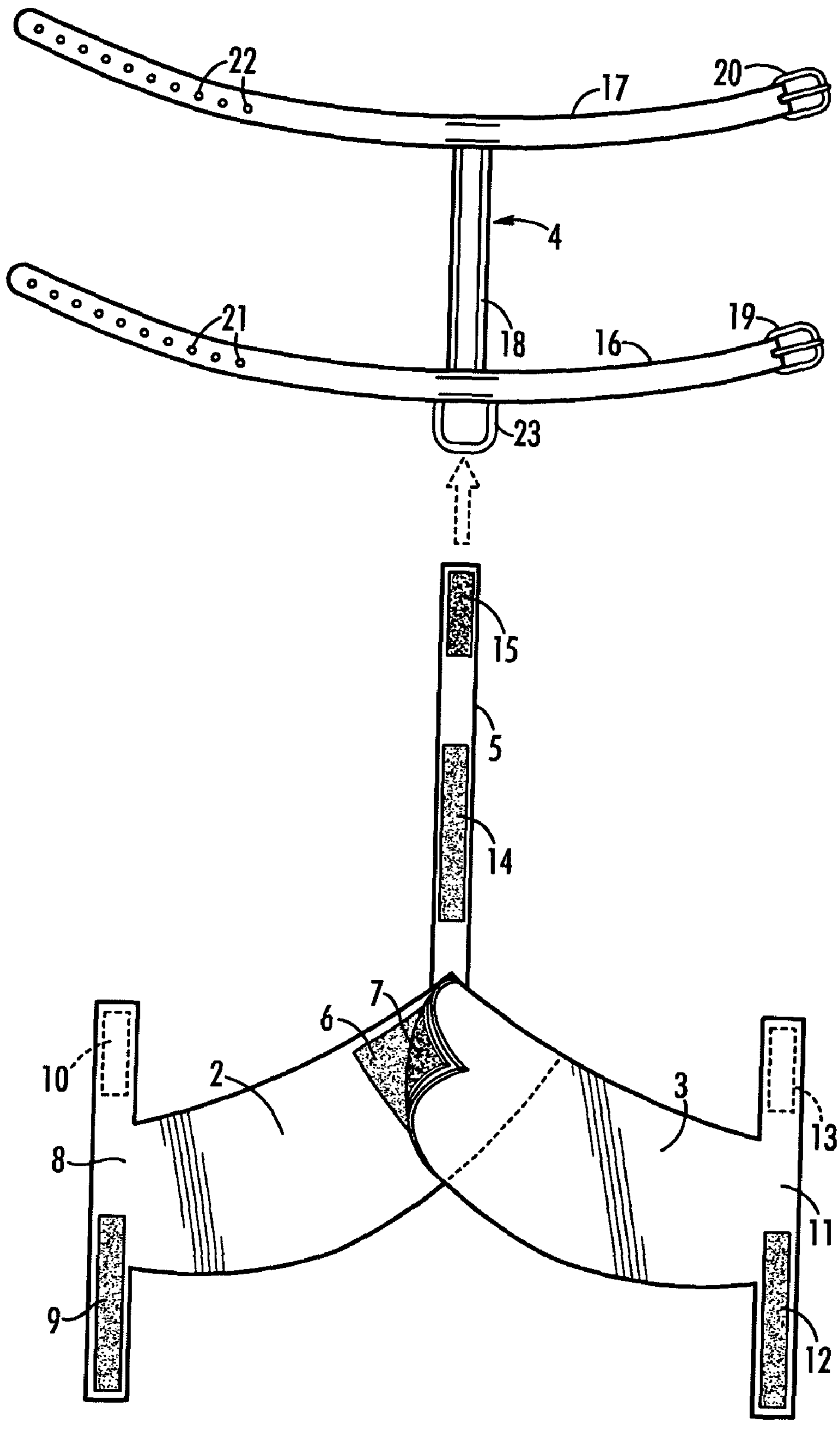
FIG. 4 illustrates a partially exploded view of an embodiment of the present invention.

The prosthetic device will be described in more detail with reference to FIG. 4. In FIG. 4, the complementary rear brace comprises a left brace, 2, and a right brace, 3. Each brace is preferably arcuate to allow the braces to properly follow the natural curvature of the canine hips. Attachment devices, 6 and 7, are provided to secure the left brace to the right brace. The left brace, 2, comprises a left leg strap, 8, which wraps around and encircles the left leg above the knee. Attachment devices, 9 and 10, are engaged to maintain the left leg strap securely around the left leg. Similarly, the right brace, 3, comprises a right leg strap, 11, which wraps around and encircles the right leg above the knee. Attachment devices, 12 and 13, are engaged to maintain the right leg strap securely around the right leg. It would be apparent that the prosthetic device is effective at augmenting the tendons of the hip without impairing movement associated with the knee joint.

Attached to at least one of the left brace or right brace is a forward projecting tether, 5. The tether preferably comprises attachment devices, 14 and 15, which allow the tether to be folded back over itself and secured by engaging the attachment devices 14 and 15.

The harness, 4, is preferably generally in the shape of an "H". An optional rear strap, 16, is attached around the body of the animal behind the front legs. A front strap, 17, is attached around the body of the animal in front of the front legs. An optional connector strap, 18, connects the front strap and rear strap and preferably is oriented to be approximately aligned with the spine of the animal. The rear strap and front strap each have attachment devices preferably in the form of a buckle, 19 and 20, and mating voids, 21 and 22. Buckle and mating voids are preferable for the harness due to the large number of harnesses currently available on the market which can be utilized with the present invention. A loop, 23, is preferably secured to the harness to allow the tether to be passed there through and folded back on itself as would be apparent. It is most preferable to employ a harness with front strap, rear strap and connector to enhance comfort for the animal.

It is particularly preferred that the various attachment devices be a continuously adjustable attachment device. Discretely adjustable devices, such as buttons and holes, snaps, belt and buckle, and the like are suitable yet these are more difficult to use. In a particularly preferred embodiment the attachment devices comprise a loop and hook device commonly referred to as VELCRO®.

Figures 5, 6:
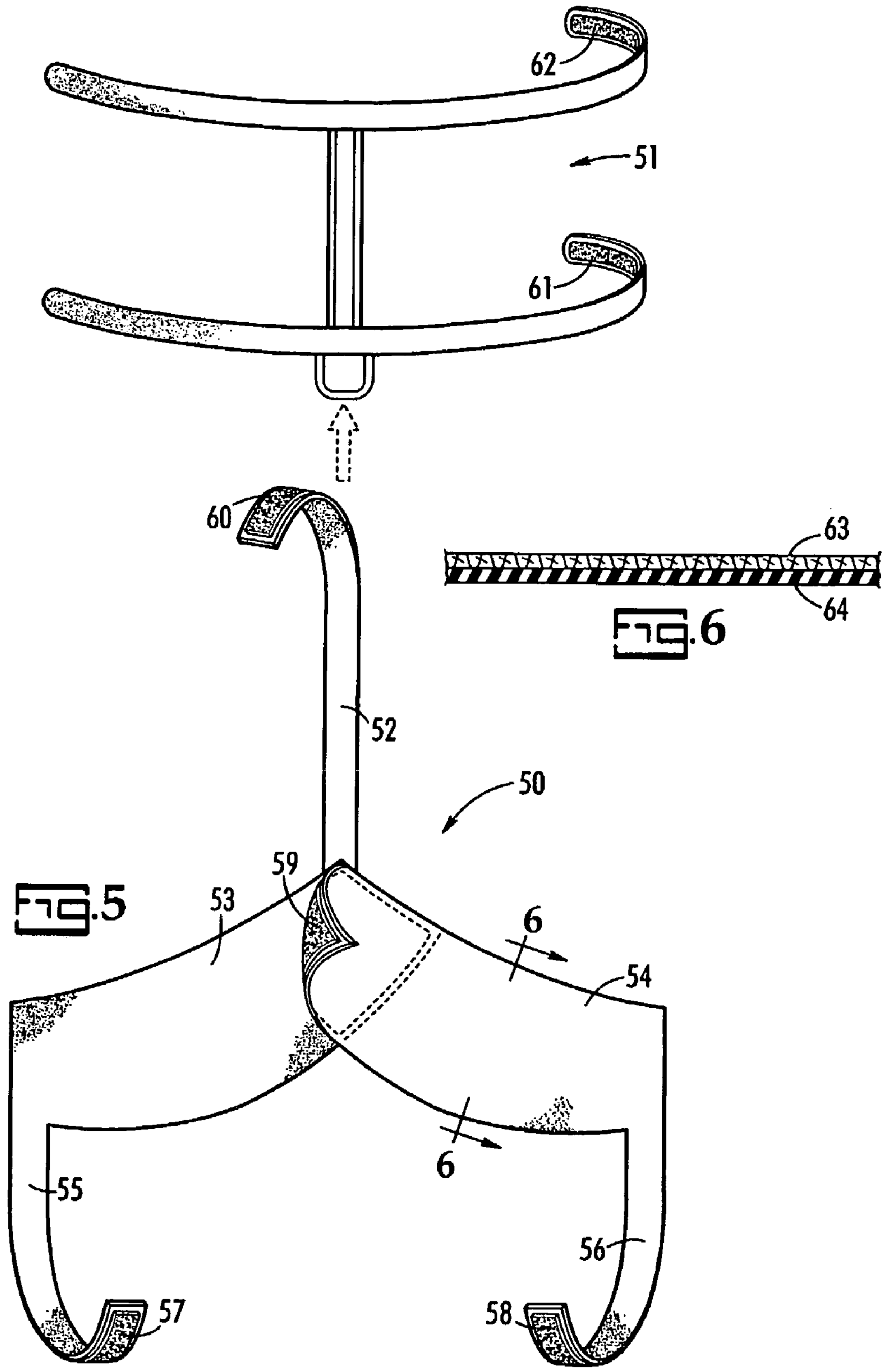
FIG. 5 illustrates a partially exploded view of an embodiment of the present invention.
FIG. 6 is a cross-sectional view taken along line 6—6 of FIG. 5.

An embodiment of the present invention is provided in FIG. 5. The prosthetic device, generally represented at 50, comprises a harness, generally represented at 51, a tether, 52, left hip brace, 53, and right hip brace, 54. The right hip brace and left hip brace are both preferably slightly arcuate with extensions, 55 and 56. In a particularly preferred embodiment at least one of the harness, 51, tether, 52, left hip brace, 53, and right hip brace, 54, comprises a two-layer construction, as in FIG. 6, comprising a stretchable fabric, 63, in one layer and a rubberized material, 64, in the second layer. The rubberized material is preferably neoprene. In the device illustrated in FIG. 5, the rubberised material is preferably oriented towards the animal while the fabric layer is oriented away from the animal. Loop tabs, 57–62, allow the various attachments to be secured by contacting the loop tab with the fabric of the mating surface. Furthermore, the device is easily adjustable by simply pulling the device in the intended direction and connecting the loop tab with the fabric. A two-layer construction is preferred, in part, due to the stretching action. The stretching action allows the prosthetic device to be applied tightly yet the prosthetic device will extend if necessary. The stretching motion avoids binding without compromising effectiveness. The fabric layer is aesthetically pleasing yet it also allows the use of a hook fastener at any point on the surface of the mating element. This allows for a large range of adjustment in a single device. It would be apparent that a flexible, loop pile fabric is preferred.

Attachment of the prosthetic device to the animal will be described with reference to FIG. 5. The order of attachment is relatively arbitrary. The harness is attached by laying the "H" shaped harness on the back of the animal with the cross-bar of the H along the spine and between the shoulder blades. The straps are then manipulated to encircle the body of the animal with one strap in front of the front legs and one strap behind the front legs. The straps are secured by contacting the loop tabs with the fabric at the appropriate location. Each hip brace is positioned on the hip of the animal and the extension is extended around the leg and secured by attaching the loop tab to the fabric. When both hip braces are attached at the leg the loop tab of one brace is brought into contact with the fabric of the other hip brace. Care must be taken to draw the two hip braces together with enough force to provide support but not so much as to cause discomfort or to limit circulation. The tether is then pulled towards the head and secured to the harness by contacting the loop tab with the fabric of the harness.

It would be understood that the installation of the prosthetic device illustrated in FIG. 4 would be similar with the difference being the type of attachment device used.

The invention has been described with particular emphasis on the preferred embodiments. It would be realized from the teachings herein that other embodiments, alterations, and configurations could be employed without departing from the scope of the invention which is more specifically set forth in the claims which are appended hereto.

What is claimed is:

1. A prosthetic device suitable for treating canine hip dysplasia and lumbosacral disorders comprising:

a harness attachable to said canine;

complementary rear braces comprising a right brace and a left brace;

wherein said right brace comprises a right leg strap encircling a right leg of said canine distal a right hip, and said left brace comprises a left leg strap encircling a left leg of said canine distal a right hip, wherein said left brace and said left brace are engageable superior to said right and left hip to apply force to persuade said hip towards a natural position; and a tether between said harness and said complementary rear braces.

2. The prosthetic device of claim 1 wherein said tether persuades said complementary rear braces towards said harness.

3. The prosthetic device of claim 1 wherein at least one of said harness, said right brace, said left brace and said tether comprise two layers.

4. The prosthetic device of claim 3 wherein one of said two layers comprises fabric.

5. The prosthetic device of claim 1 wherein said left brace and said right brace are engagable by a hook and loop fastener.

6. The prosthetic device of claim 1 wherein said harness comprises a front strap, a rear strap and a connector strap there between.

7. The prosthetic device of claim 1 wherein one of said left brace and said right brace is arcuate.

8. A prosthetic device for treating canine hip dysplasia comprising:

a harness attachable to said canine;

a rear brace comprising a right brace and a left brace wherein said right brace comprises a right leg strap for encircling a right leg distal to a right hip of said canine, and said left brace comprises a left leg strap for encircling a left leg distal to a left hip of said canine, wherein said right brace is engageable superior to said right hip and attached to said left brace; and a tether between said harness and said complementary rear braces to persuade said rear brace toward said harness.

9. The prosthetic device of claim 8 wherein said left brace and said right brace reversibly persuade a right hip and a left hip towards each other.

10. The prosthetic device of claim 8 wherein said right brace and said left brace are separate elements.

11. The prosthetic device of claim 8 wherein said right brace and said left brace are arcuate.

12. The prosthetic device of claim 8 wherein said left brace and said right brace comprise two layers.

13. The prosthetic device of claim 12 wherein one layer of said two layers is rubberised.

14. The prosthetic device of claim 12 wherein one layer of said two layers is fabric.

15. The prosthetic device of claim 8 wherein said harness comprises a front strap, a rear strap and a connector strap there between.

16. A method for treating canine hip dysplasia comprising the steps of:

attaching a harness to a canine;

attaching a right brace distal to a right hip of said canine;

attaching a left brace distal to a left hip of said canine;

connecting said right brace to said left brace wherein said right brace and said left brace persuades said right hip and said left hip inward towards each other and persuade the femur superior into the acetabulum;

connecting a tether between said harness and at least one brace selected from right brace and left brace to persuade said right brace and said left brace towards said harness.

17. The method of claim 16 wherein said harness comprises a front strap, a rear strap and a connector strap there between.

18. The method of claim 16 wherein said left brace and said right brace comprise two layers.

19. The method of claim 16 wherein said left brace and said right brace are connected by a hook and loop connector.

* * * * *